United States Patent [19]

Boyer et al.

[11] Patent Number: 4,619,336

[45] Date of Patent: Oct. 28, 1986

[54] METHOD OF AND APPARATUS FOR WEIGHING DOSES OF POWDER

[75] Inventors: Richard Boyer, Cusset; Jöel Diquet, Vichy, both of France

[73] Assignee: Manufacture de Machines due Haut-Rhin, Mulhouse, France

[21] Appl. No.: 597,463

[22] Filed: Apr. 6, 1984

[30] Foreign Application Priority Data

Apr. 18, 1983 [FR] France ............................ 83 06297

[51] Int. Cl.$^4$ ............... G01G 19/00; G01G 19/52; G01G 13/00; G01G 13/02
[52] U.S. Cl. .......................................... 177/1; 177/50; 177/64; 177/116; 177/45
[58] Field of Search ............... 177/1, 45, 50, 60, 64, 177/114, 116

[56] References Cited

U.S. PATENT DOCUMENTS

| 3,091,301 | 5/1963 | Stone | 177/64 X |
| 3,219,132 | 11/1965 | Nowak, Jr. | 177/114 X |
| 3,477,529 | 11/1969 | Burn et al. | 177/50 |
| 3,828,869 | 8/1974 | Sellers | 177/116 X |
| 4,381,545 | 4/1983 | Biddle, III et al. | 177/116 X |

Primary Examiner—E. A. Goldberg
Assistant Examiner—Patrick W. Foster

[57] ABSTRACT

Method of and apparatus for dosing powders by weight. To introduce a weight of powder with a predetermined final value $P_3$ into a weighing receptacle, the functioning of mechanism for positively feeding the powder to the receptacle is controlled by a continuous comparison between the effective weight of powder received by the receptacle following an initial instant $t_0$ and a theoretical weight conforming to an ideal evolution of such weight of powder as a function of time; at a final predetermined instant $t_2$ with reference to the initial instant $t_0$, the positive feeding mechanism is stopped and the powder remaining is allowed to run into the weighing receptacle in an amount corresponding to the amount of poweder which is lost during its transmission by the feeding mechanism.

11 Claims, 4 Drawing Figures

FIG_1

METHOD OF AND APPARATUS FOR WEIGHING DOSES OF POWDER

The present invention relates to a method of and an apparatus for the weighing of doses of powder.

The invention has among its objects the perfecting of prior known methods of and apparatus for employing a balance provided with a weighing receptacle and means for continuously measuring the effective weight of the contents of the receptacle. Such prior apparatus includes force sensors such as strain gauges, such as piezoelectric cells, a Cotton balance, a vibrating strand or other similar means, which control, through the intermediary of appropriate electronics, the course of travel of the powder to be dosed toward the weighing receptacle, constituted by discharge systems such as a vibrating neck or spout, a vibrating basin, an Archimedes screw, a controlled gate, an endless belt, or other similar apparatus.

Usually the method of weighing powder as it is moving toward the weighing container takes place in two successive steps, that is to say, in a first comparatively large step permitting the rapid introduction in a weighing container of a weight of powder more or less near the final predetermined value to be obtained or dosed, then in a second place taking away a small part of the weight of the powder so as to permit an approximation to the final predetermined value to be dispensed or dosed.

In the prior art, said two values are predetermined and constant, and correspond, for example, if the means for positively feeding the powder toward the weighing receptacle is constituted by a vibrating spout, respectively, by two predetermined different amplitudes of vibration of the spout.

Then, the prior art had two methods for determining the transition between the comparatively large dose or measured quantity of powder and the comparatively small dose or measured quantity of powder: these flows being predetermined, one decides to operate the transition either at the beginning of a predetermined time, or at a predetermined value of the weight of the contents of the weighing receptacle, corresponding to a predosage.

In the first case, having been given the fact that the real flow or quantity of the powder is only approximately constant during the course of its weighing, and for the greater reason that there are possible variations in the amount weighed due to the physical state of the powder, and, for example, by reason of its granulometry, that is the size of the individual grains and its humidity content, thus influencing its ease of flowing, one adopts a security measure to conserve a large quantity of the powder to permit flowing out at a comparatively low rate, whereby to increase the effective weighing time. In the second case, equally by reason of inevitable variations in the physical state of the powder to be weighed, the time for flowing out a comparatively large flow of powder varies, such variation influencing the total time of the weighing operation.

In the one case and in the other case, the dosing ends in a comparatively small flow, since the means for continuously weighing the contents of the weighing container detect a value of such weight equal to the final predetermined value of the dose to be obtained, or near to and less than a quantity corresponding to the error of powder loss, that is to say, to the weight of the powder again delivered by the positive flowing means after the interruption of their functioning; according to the physical state of the powder to be weighed, as a function of the weight of the powder effectively received as a comparatively important flow by the weighing container, the duration of the time of flow of the comparatively small flow is also led to vary.

It thus results that, no matter which of those two actually known solutions one adopts, the total time of a dosing cycle varies from one cycle to another, which is particularly inconvenient since one seeks to obtain a cadence which is at once fast and regular and since the weight dosage is included as a part of an immutable cycle of operations for which one cannot assign an order of priority for the various steps.

The present invention has among its objects the perfecting of such known methods; the invention provides a method of and an apparatus for the dosing of powder which permits the use, with a great precision of the required dosage, of a fixed constant time for the dosing cycle.

Besides, having a care for simplicity and economy, such object can be obtained without recourse to complex calculations, that is to say, without recourse to a calculator.

To this end, the method of weighing dosages of a powder in accordance with the invention employs in a manner known per se a balance provided with a weighing receptacle and means for continually measuring the effective weight of the eventual contents of the receptacle, and means for positively causing the powder to be dosed to flow toward the weighing receptacle. Such method consists, at the time of the cycle of dosage, in operating the means for causing the powder to flow at an initial moment in which the receptacle is theoretically empty to a final instant in which the receptacle has received from the powder feeding means, after the initial moment, a weight of powder having a predetermined value and less than the final predetermined value to be obtained, or a dose of a quantity corresponding to an acceptable error from the means for causing the powder to flow, and interrupting at such final instant the functioning of the powder feeding means and finally letting the residual powder flow into the receptacle, such residual powder corresponding to the effective acceptable error.

The method is characterized in that one predetermines the said final instant with reference to the initial instant, so that there is an ideal evolution of the weight of the powder received by the receptacle as a function of time, from the initial instant to the final instant, and in the fact that, at every instant of the functioning of the means for the feeding of the powder, the effective weight of the powder received in the receptacle since the initial moment and a weight and a theoretical weight conforms to such ideal evolution. Such control is used continuously as a function of such comparison, in order to augment the flow if the effective weight is less than the theoretical weight at the instant considered, or to reduce the flow if the effective weight is greater than the theoretical weight at the instant considered. Thus the evolution of the effective weight of powder received since the initial instant by the receptacle, and then the functioning of the powder feeding means, are employed to arrive at the ideal evolution of the quantity of the powder dosed.

Such continuous manner of action upon the powder feeding means permits the apparatus to compensate at every instant all the unwanted forces which perturb the effective flow of the powder, such causes being caused by the powder to be dosed, and, for example, to the variable size of the powder grains, density, and hygrometry of the powder, or imputable to the powder feeding means itself, and, for example, to the variations of local electrical voltages which feed the apparatus, or to the heating of the apparatus, causing a modification of the functioning thereof.

Advantageously, one predetermines the ideal evolution of the weight of the powder received by the receptacle as a function of time in such manner as to define a comparatively large flow or amount of powder at the initial instant to a predetermined intermediate instant with reference to the initial instant, and a flow which is comparatively small from the intermediate instant to the final instant. This permits at the same time a reduction of the total time duration of a dosing cycle by making the final flow very small, and also reduces the error which arises during the discard phase of the cycle. In effect the automatic compensation described above permits the use at the intermediate instant of reception by the weighing receptacle, of a well determined quantity of powder flow which is comparatively large. This facilitates the final dosage since one requires only a comparatively small flow because the weight of the powder remaining to be delivered can be reduced to a minimum. All of these factors increase the precision of weighing the powder while conserving a high speed of cadence and regularity of operation of the apparatus.

Insofar as it effects the ideal evolution which one chooses, and notably in the case of the manner of operation of the apparatus, one obtains from the method according to the invention an adaptation as compact as possible to arrive at such ideal evolution, that is the evolution of the effective weight of the powder received by the receptacle. The apparatus of the invention permits the obtaining of a constant length of time of the dosing cycle, corresponding to the time span which separates the final instant from the initial instant augmented by a length of time which is comparatively small and easily predeterminable, for example empirically, sufficient for the flowing of a quantity of powder corresponding to the effective error of powder loss or discard, all while respecting an evolution of an amount of powder having a great precision of dosage, that is to say, an evolution involving, at the end of the cycle, a palpable reduction of the flow rate of powder.

The apparatus for performing the method conforming to the invention does not need the utilization of calculating and does not require the use of a computer.

In effect, the present invention also proposes, for the apparatus to carry out the method, apparatus for dosing by weight of a powder involving:
 a balance provided with a weighing receptacle and with means for continuously measuring the effective weight of the contents of the receptacle, permitting at each instant a first signal representative of such weight,
 means for positively feeding the powder to be dosed toward the weighing receptacle, such means discharging the powder above the receptacle,
 and which is characterized by the fact that it comprises at least,
 primary consigning means to consign a predetermined final value of the weight of the powder to be obtained, or dosed, and a predetermined quantity corresponding to a weight loss error of the powder delivered by the powder feeding means,
 second consigning means, to consign an ideal evolution of the weight of the powder received by the receptacle as a function of time, in the course of a dosing cycle,
 a first comparator, comparing at each instant of a part at least of the first signal to a representative predetermined final value reduced by said predetermined quantity and of another part of the first signal to a threshhold representative of the theoretical weight at such instant, conforming to said theoretical evolution, and to emit a second signal as a function of such comparison,
 continuously operating means responsive to the second signal for governing the rate of feeding of the powder by the positive powder feeding means.

Corresponding with the preferred apparatus for carrying out the method described above, the ideal evolution consigned in the second consigning means can advantageously be disassociated into two phases including a first comparatively large theoretical phase of powder flow and a second comparatively small theoretical phase of powder flow, the transition between the two phases corresponding to an intermediate predetermined value between the value zero and the said predetermined final value reduced by said predetermined value, the intermediate value being that associated at an intermediate predetermined instant between the initial instant and the final instant in each cycle of dosage.

In order to prevent the consequences of erratic dosing, for example from an error of powder loss which causes a deviation in an admissable way from the predetermined calculated manner of arriving at the error of powder loss or for example empirically, the upper permissible limit of error is predetermined, and also a lower admissible limit is predetermined, around the final predetermined quantity of the dose and, after having allowed the residual powder to flow into the weighing receptacle in an amount corresponding to the effective amount of loss of the powder after the predetermined final instant, the effective weight of the powder received by the receptacle is determined at its limits, to define a good weight or a bad weight which, respectively, according to the effective weight, is disposed between the said limits or outside of them; such control is exercised at the expiration of a predetermined time delay after the said final instant, such delay being established in such manner that it is sufficient to permit the quantity of powder corresponding to the effective amount which has been lost to flow into the receptacle.

Besides, in order to increase the acccuracy of dosage, the effective weight of the powder received in the powder feeding means at every moment is determined from the initial moment in order to deduce, from the measured value furnished at the instant considered by the measuring means, the measured value furnished by the latter at the initial instant; for this purpose there are provided means denoted "delivery at zero" of the means for continuously measuring the effective weight of the contents of the receptacle, at each dosing cycle; it is thus possible to compensate particularly for the drift of the measuring means.

Still further, if one should wish to dose a pulverulant product presenting a risk of adherence to the walls of the weighing receptable, it is then possible, at the beginning of the dosing cycle, to detect the adherence of an excessive quantity of powder during the preceding cycle, this appearing as an incomplete emptying of the weighing receptacle, that is to say by the evacuation from it of an incomplete dose, or even evacuation during the preceding cycle, of an excessive quantity of powder accumulated simultaneously and proportionally in the cycles, by adherence, such value being evinced by the evacuation of an excessively large dose.

For this purpose, the effective value of weight of the contents of the weighing receptacle, measured by the measuring means after the evacuation of the receptacle at the end of a dosing cycle, can be either positive or negative instead of being zero, taking into account the return to zero effected by said cycle, according to, respectively, there has been evacuated in reality less than the dose or more than the dose, one predetermines an upper limit designated "positive" and a lower limit designated "negative" in the value of the measure furnished at the initial instant by the measuring means, and according to whether such value is disposed between or outside of said limits, respectively, one defines a good preceding dosage or a bad preceding dosage in rejecting the inclusion of the cycle in the operation of the apparatus if such value exceeds the upper limit.

Other characteristics and advantages of the invention will appear in the following description, relative to a non-limiting method in accordance with the invention, as well as the annexed drawings which form an integral part of such description.

Figure 3:
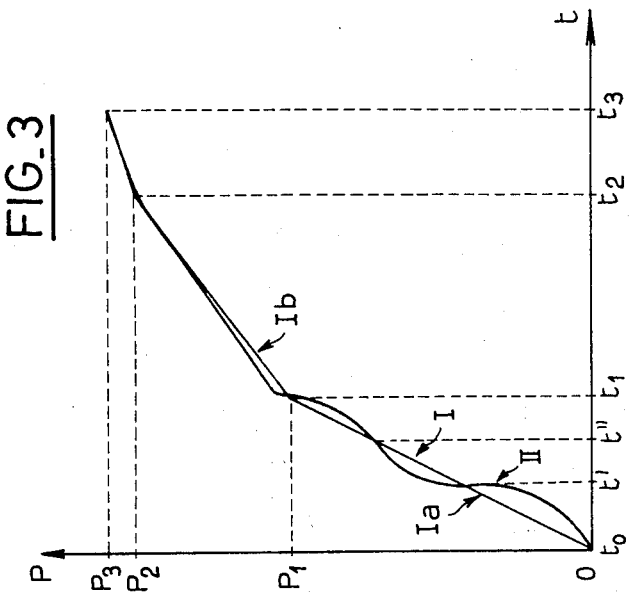
Figure 4:
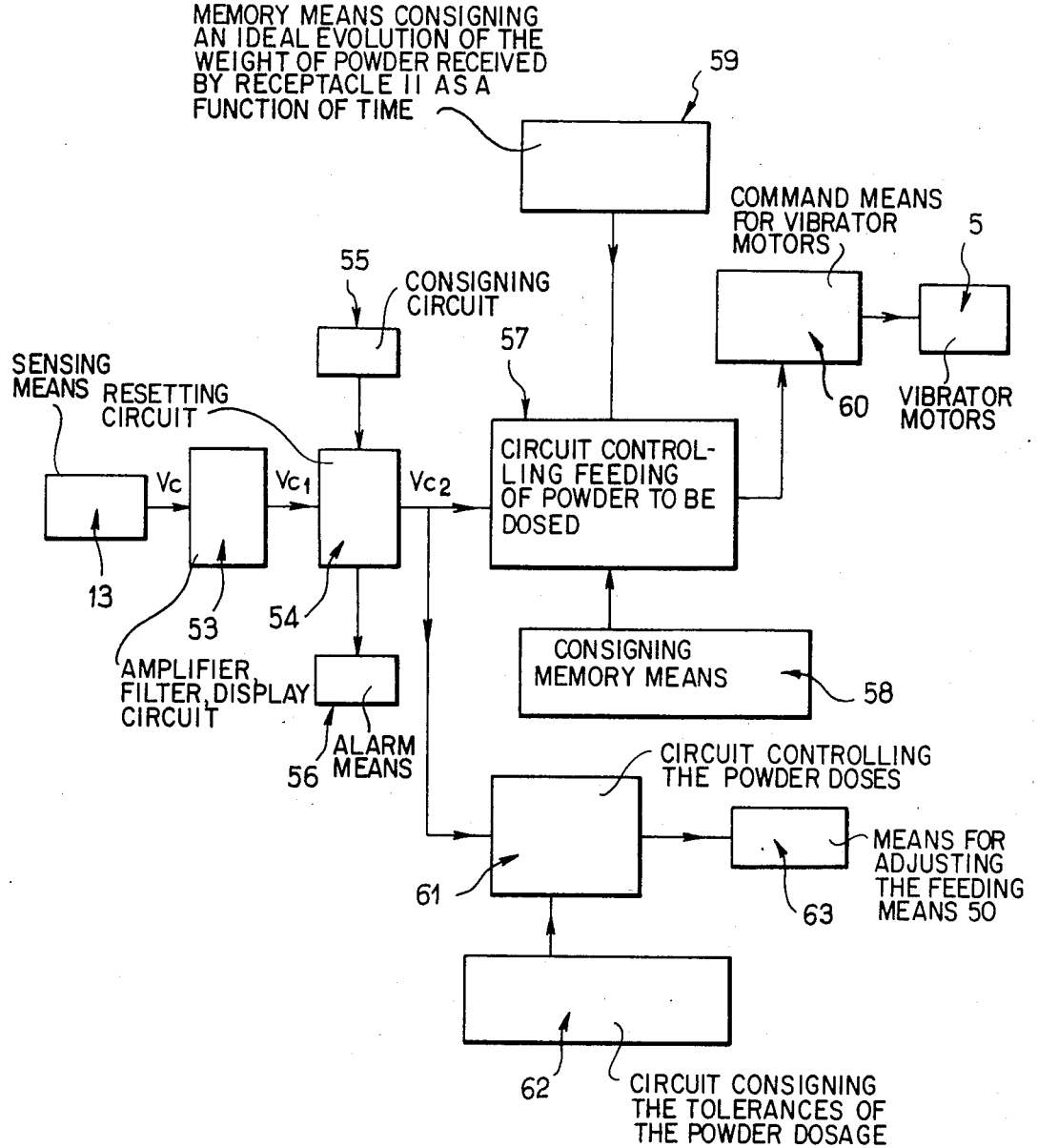

FIG. 3 is a graph illustrating on the one hand an example of an ideal building up of the weight of powder received by the weighing receptacle as a function of time (curve I) and on the other hand an example of the actual building up of such weight (curve II); in such graph time t being the abscissa and the weight of powder P being the ordinate; and FIG. 4 is a block diagram of the electronic system associated with the balance for carrying out the method of weighing according to the invention.

Figure 1:
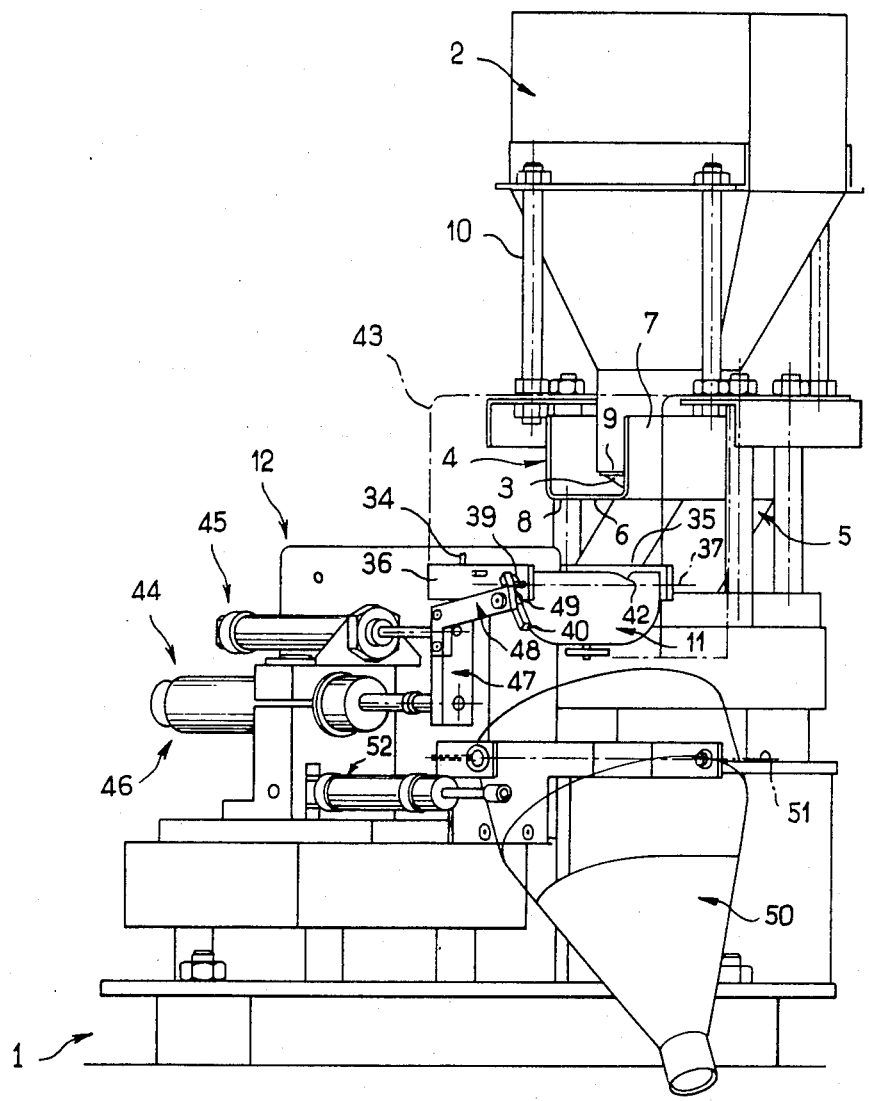
FIG. 1 is a view in perspective of a weighing dosing apparatus for performing the method of the invention.

Turning first to FIG. 1, such figure shows an apparatus according to the invention mounted upon a frame 1, which will serve in the following description as a fixed frame of reference.

Toward the top, the frame 1 carries in a fixed manner a hopper 2 which stores the powder being fed downwardly, through a funnel 3, in an enclosure 8 having a bottom 6 which is flat and approximately horizontal and upwardly sides, of a neck or spout 4 carried by the frame 1 and vibrated through the intermediary of motors 5 adapted to communicate a vibratory movement with an amplitude proportional to the voltage of the electric current supply to the motors 5, as is known per se to those skilled in the art.

With the exception of the diverted portion 8, which is flat and horizontal, the edges of the bottom 6 of the spout 4 are provided with edges which turn upwardly and which fit externally around the mouth 3 of the lower part of the hopper 2; taking into account that it forms a funnel, such spout 3 presents toward the edge, at a distance and above the bottom 6, a lower straight edge 9, which is horizontal and parallel to the edge 8, and which constitutes a zone of less height; the vertical distance separating the edge 9 from the level of the bottom 6 of the spout 4 determines the formation, upon said bottom 6, of a powder layer having the thickness of said vertical distance, the vibratory movement of the spout 4, which by means of the motors 5 when running, make the powder migrate toward the edge 8, cause the powder in said layer to be fed into the spout 4; the thickness of the powder layer thus formed upon the bottom 6 of the spout 4 can be regulated by the regulation of the height of the edge 9 with respect to the height of the bottom 6 of the spout 4. In the illustrative example in which the level of the bottom 6 is fixed with respect to the frame 1, such regulation is obtained by the regulation of the height of the hopper 2, and for example by the regulation of the height of the columns 10 which connect the hopper 2 to the frame 1.

Figure 2:
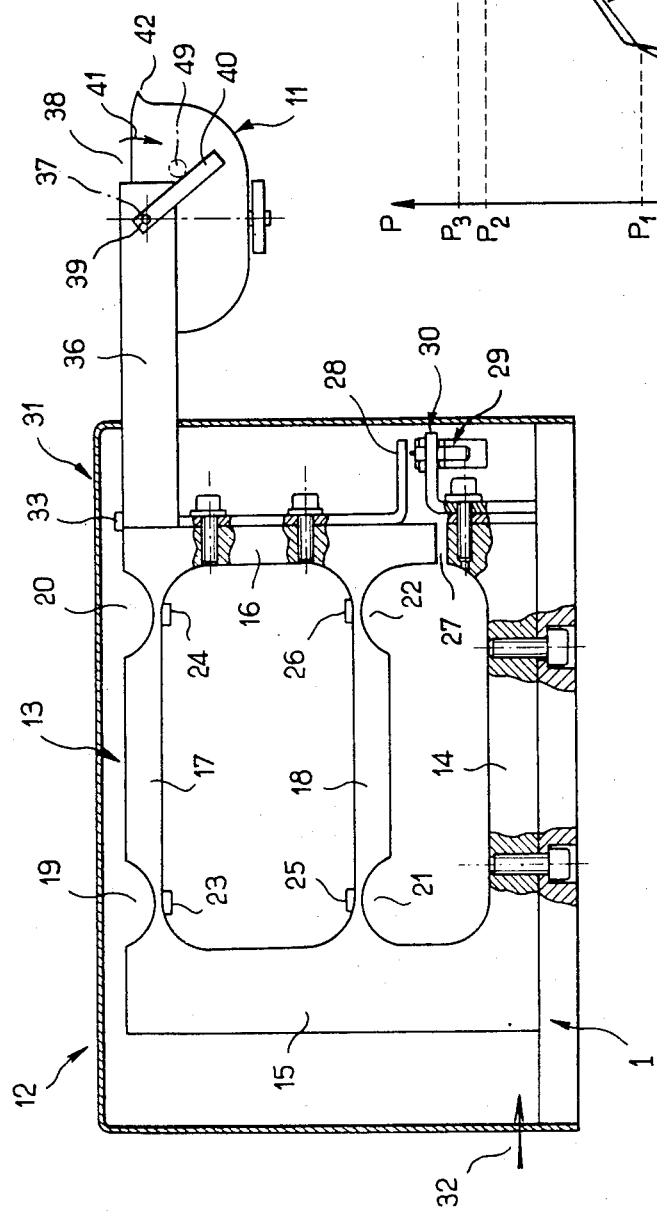
FIG. 2 is a fragmentary view partially in side elevation and partially in section of the weighing balance of the apparatus of the invention.

To collect the powder which thus falls from the spout 4 over the diverting edge 8 thereof when the motors 5 are running, there is provided upon the edge 8 vertically therebeneath, a weighing receptacle 11 in the form of a bowl, forming a integral part of balance 12, designated generally in FIG. 1 and specifically shown in FIG. 2.

FIG. 2 illustrates by way of a non-limiting example a balance 12 presenting, by way of example, means for measuring the weight of the contents of the weighing receptacle, a strain gauge weight sensing means 13.

The illustrated means 13, of a type made by the Societe "Transducers, Inc.", and sold by the firm "GEC Components" under reference C 462-02-10 P1, comprises a horizontal base 14 fixedly attached to the frame 1 of the apparatus and carrying, in a solid and rigid manner, a vertical mounting means 15 to which a second mounting vertical mounting means 16 is connected by two transverse members 17, 18 disposed approximately horizontal, parallel to each other and superimposed vertically one above the other, forming a relative separation; at their connections with the mounting means 15 and 16, the transverse members 17 and 18 present narrow spaces, respectively designated 19 and 20, as concerns the upper transverse member 17, and 21 and 22 insofar as it concerns the lower transverse member 18, so that the vertical mounting means 15 and 16 and the transverse members 17 and 18 define a parallelogram which elastically deformable in a vertical plane formed by the vertical and transverse mounting members. In the immediate proximity of each of the narrow parts or strictures there is disposed upon the corresponding transverse parts 17 or 18, a strain gauge, designated respectively 23, 24, 25, and 26, said different strain gauges being connected on a mounting means known to those skilled in the art, in such manner as to furnish an electrical potential representative of the eventual deformation of the parallelogram constituted by the vertical mounting members 15 and 16 and the transverse mounting members 17 and 18 at a given instant. To permit such deformation in a downward direction of the member 16 as a part of an equilibrium position of the parallelogram, there is provided between the lower extremity of member 16 and the base 14 a play or space 27; the deformation in such direction is nevertheless limited by an abutment system disposed upon a horizontal leg 28 fixed to the means 16 in proximity to the lower end thereof and the upper end of a screw 29 which one can adjust more or less in a vertical direction, in a leg 30 of a part which is solidly affixed to the base 14, under the leg 28 and at a distance therefrom, in such manner that after a predetermined course of the mounting means 16 in a downward direction from the equalibrium position of the parallelogram, the leg 28 abuts the upper end of the screw 29.

The means 13 thus constituted is disposed in the interior of a sealed container 31, having an admission port for air under pressure, schematically shown at 32, and two vertical slits 33 and 34 arranged in the proximity of the means 16 to permit the deviation, with respect to the frame 1, of the two horizontal arms 35 and 36 carrying the weighing receptacle 11 outwardly of the enclosure 31. The admission of air under pressure through means 32 in the enclosure 31, with the evacuation of such air by the slits 32 and 33, which constitute the only openings in the enclosure, produces within the interior of the enclosure a circulation of air which favors the thermal exchange between the different strain gauges 23, 24, 25, and 26 and also renders uniform the temperature conditions thereof at their different locations; on the other hand, if the interior of the enclosure 31 is at a pressure somewhat less than that of the atmosphere, the evacuation of such air by the slits 33 and 34 prevents the entry of the powder into the interior of the enclosure 31, whereby generally to prevent the incrusting of the powder, in the particular case explosive powders, thus imparting to the balance 12 total security. It is to be noted that because of this, also, all electrical parts of the apparatus are isolated from the interior of the enclosure, as, for example, the motors 5, the enclosure of which has been schematically shown at 43 in FIG. 1.

As is shown more particularly in FIG. 1, the arms 35 and 36 are horizontal, disposed at the same height, and spaced vertically from one another in such manner as to receive between them the weighing receptacle 11; they are disposed symmetrically with respect to each other and with respect to the vertical plane of the collector 13, that is to say, the mounting means 15 and 16 and the transverse members 17 and 18 thereof which are disposed in a plane in which there is disposed the deformable parallelogram defined by the vertical members 15 and 16 and the transverse members 17 and 18.

In the proximity of their most distant respective extremities of the member 16, the two arms 35 and 36 carry a respective bearing receiving a respective axle 37 for pivoting the receptacle 11 with respect to the two arms 35 and 36; such axle 37 is horizontal and perpendicular to the main plane of the receptacle 13 defined above; it is disposed with respect to the center of gravity of the receptacle 11 in such manner that the latter tends naturally to occupy a position of equilibrium in which it is open toward the top, in practice the upper open end 38 of the receptacle 11 being disposed between the diverting edge 8 of the spout 4 in order to receive the powder which has been diverted from the spout 4 when the motors 5 are running.

To permit the application, to the weighing receptacle 11, of a pivoting movement around the axle 37 with respect to the arms 35 and 36, relative to the equilibrium position thus defined, so as to bring about its diversion, the axle 39 of the receptacle 11 carries solidly affixed thereto, outwardly beyond the corresponding arm 36 with respect to the receptacle 11, a straight lever 40 oriented radially with respect to the axle 37.

When one refers to the equilibrium position of the weighing receptacle 11 illustrated in FIGS. 1 and 2, and taking into account the direction of pivoting of such receptacle indicated by the curved arrow 41 in FIG. 2, corresponding to a descending movement of the righthand edge or lip of the receptacle (FIG. 2) the respective zones of the lever 40 which are disposed at increasing distances from the axle 37 are situated further and further from the means 13. In such position of equilibrium, the mean inclination of the lever 40 with respect to the vertical is for example on the order of 30°, such value being given as a nonlimiting illustration.

With the lever 40 thus oriented there cooperates a means 44 (FIG. 1) for turning the receptacle 11.

Such means 44 is mounted upon the frame 1 at the side of the balance 12, that is to say to the left of the balance 12 (FIG. 1). Device 44 comprises a hydraulic cylinder 45 and a hydraulic dashpot 46 the respective bodies of which are solidly affixed to the frame 1 and occupy a horizontal position, below the height of the axle 37, the piston rods of means 45 and 46 being affixed to a common vertical plate 47 through the intermediary of a bracket having a shallowly inclined arm 48, the righthand end of arm 48 (FIG. 1) carrying a finger 49 which lies near the lever 40 and cooperates therewith to rotate the weighing receptacle in the direction 41. Finger 49 comes into contact and glides along the lever 40 after having traveled through a distance of play of some tenths of a millimeter. The position of equilibrium of the receptacle 11, in which its opening 38 is disposed at the top as shown in FIG. 2, corresponds to the maximum extension of the respective piston rods of the cylinder 45 and the dashpot 46, and a retraction of the piston rods, caused by the hydraulic cylinder 45 and permitted by the dashpot 46 through the intermediary of the plate 47, causes the application to the lever 40, by the finger 49, of a force which causes the receptacle 11 to rotate in the direction 41 around the axle 37 with respect to the arms 35 and 36. The length of the lever 40, measured radially from the axle 37, is determined as a function of the relative positions of the different elements of the driving means 44 and of the axle 37, in such manner that the turning movement of the receptacle 11 under the action of means 44 takes place through at least 90°, so as to assure the maximum probability of complete emptying of the receptacle 11 upon its thus being turned. The movement of extension and retraction of the respective cylinder 45 and the dashpot 46 permit a return by gravity of the receptacle 11 to its equilibrium position, in which its opening 38 is disposed at the top thereof.

To receive the contents of receptacle 11, when the receptacle discharges them, there is provided thereabeneath a discharge funnel or barrel 50 preferably mounted for pivoting about a fixed horizontal axis 51; the discharge funnel 50 may thus pivot, under the action of means such as a cylinder 52 of which the body is pivotally connected upon the frame 1 and the piston rod thereof upon the funnel 50, between two positions corresponding respectively to the emptying of the contents of the weighing receptacle 11, upon tipping of the same, toward means (not shown) for feeding the powder for a further treatment, in the case of a dose considered to be the best by automatic means which will be defined later on, or the evacuation of said contents upon refusal or cancelling thereof, or toward recycling means in the hopper 2 in the case of a dose which would be considered by automatic means as being bad.

In accordance with the preferred embodiment of the invention described herein, the means which will be described is provided with an electronic control which will now be described with reference to FIG. 4.

The means 13 of FIG. 2 is shown in FIG. 4; means 13, in a manner known per se, presents an output which it continuously delivers when in service, in the form of an electric signal $V_c$ which is a voltage proportional to the effective weight of the eventual contents of the weighing receptacle 11, signal $V_c$ being advantageously able to be constituted by an electric voltage, as is known per se.

The output of the means 13 is electrically connected to the input of a circuit 53 which responds to the form (magnitude) of the signal $V_c$. Circuit 53 amplifies the signal, filters it, displays it, and the circuit 53 delivers therefrom a signal $V_{c1}$ proportional to the effective weight of the powder in the weighing container 11.

To avoid errors due to departures of the means 13 as to temperature and changes in the powder remaining in the weighing receptacle 11 before the beginning of a new dosing cycle, the signal $V_{c1}$ delivered by the circuit 53 is fed to the input of a circuit 54 of return to zero (resetting), which at every instant t of a dosing cycle cuts short the signal $V_{c1}$ issued by the circuit 53 the signal issued by the same at the initial instant $t_0$ of the dosing cycle, that is to say just before the introduction of the powder into the weighing container 11 during the cycle, and retained at such instant $t_0$ in the circuit 54 by appropriate means.

The signal $V_{c2}$ resulting from such subtraction constitutes the output signal of the circuit 54, of the same nature as $V_c$.

Beyond the means for memorization of the signal $V_{c1}$ issuing from the circuit 53 at the initial instant $t_0$ of a dosing cycle, the circuit 54 is connected to a consigning circuit 55 to enter two limits of delay with respect to zero into a memory device, a comparator to compare the delay to zero effective within said limits, and alarm means 56 operated by the comparator as a function of said comparison, and in practice if the time of the return to effective zero finds itself outside said two limits.

More precisely, the two limits of time delay to zero susceptible of being thus entered into the memory device consist of a predetermined upper limit designated "positive" and an equally predetermined lower limit designated "negative" to which one fixes the measured value furnished by the measuring means 13 at the initial instant of each cycle, and more precisely to the value of $V_{c1}$ at the instant $t_0$, and the comparator of circuit 54 determined from a good precedent dosage or a bad precedent dosage according to whether such value is disposed between or outside of said limits, respectively, in energizng an alarm in the last case and in refusing the continuation of a dosing cycle if the value of $V_{c1}$ at the instant $t_0$ exceeds said consigned upper limit.

In effect, it is preferred at the beginning of each cycle to detect whether upon the discharge of the dose contained in the weighing receptacle 11 at the end of the preceding cycle, an excessive quantity of powder does not remain attached to the walls of receptacle 11, with the resulting delivery from the receptacle 11 of a dose of powder which is too small as compared to the preceding cycle, in whic case the upper limit of the return to zero is exceeded due to the fact the presence of an excessive quantity of powder in the receptacle 11 after the discharge of the same, or even if, upon the emptying of the container 11 in the course of the preceding cycle, little quantities of accumulated powder on the wall of the receptacle 11 during the preceding emptying thereof, without which the doses then delivered are disposed outside the consigned tolerances, nor are they emptied from the receptacle in the same time that the weighed dose with the resulting delivery of a dose which is too large, in which case the value $V_{c1}$ furnished at the time $t_0$ is less than the consigned lower limit designated "negative". In the first case, it is convenient to signal the delivery of a dose which is too small, and in the second case the delivery of a dose which is too large, and if the dose delivered in the preceding cycle is too small, which signifies the presence in the receptacle 11, at the initial instant, of an excessive quantity of powder adherent to it, it prevents the beginning of a new cycle until such powder has been removed from the receptacle.

The emitted signal $V_{c2}$ furnished by the circuit 54 thus constitutes a signal which is representative, at each instant of a dosing cycle, of the effective weight of powder received from the spout 4 by the receptacle 11, since the initial instant $t_0$ of the cycle; signal $V_{c2}$ constitutes the input signal of a circuit 57 which controls the feeding of the powder to be dosed toward the weighing receptacle 11 by the vibrating spout 4.

With the circuit 57 there are associated first consigning memory means 58, the consign a predetermined final value of the weight of powder to be obtained, that is to say a predetermined value which the signal $V_{c2}$ must equal for the dose powder contained in the receptacle 11 at the end of a dosing cycle corresponding to the desired dose, and a predetermined quantity corresponding to an error of loss of powder produced by the means of feeding the powder toward the receptacle 11, here constituted by the vibrating spout 4, such error of powder loss being advantageously empirically determined before the beginning of a series of dosing cycles dosing a powder of the same nature under ambient conditions, notably hygrometry, which may be considered as being identical.

In practice, such final predetermined value and the corresponding predetermined value of an error of powder loss are consigned by two external memory means, thus, in the illustrative example, in the form of voltages by means of potentiometers.

There are associated with the circuit 57 at least two consigning memory means 58 59 to consign an ideal evolution of the weight of the powder received by the weighing receptacle 11 as the function of time, in the course of a dosing cycle.

FIG. 3 illustrates in curve I an ideal evolution of powder received by the receptacle 11, as a preferred non-limiting example.

According to such example, the evolution I defines two successive phases corresponding to two rates of delivery or flow of the powder, said rates being constant but different, of means for feeding the powder toward the weighing receptacle 11, constituted by the vibrating spout 4: at the initial instant $t_0$ of a dosing cycle, at which the theoretical weight of the powder in the receptacle 11 is zero, to a predetermined instant $t_1$ as a function of the instant $t_0$ and which corresponds to a theoretical weight $P_1$ of powder in the receptacle 11, the rate of feeding is constant and comparatively large whereas from the instant $t_1$ to a final instant $t_2$ at which the theoretical weight $P_2$ of the powder in the receptacle is less than the predetermined quantity corresponding to the error ($\Delta = P_3 - P_2$) by powder loss to the predetermined final value $P_3$ or the dose of powder to be obtained, such rate of feeding or delivery is equally constant but comparatively small (as shown respectively, at zones $I_a$ and $I_b$ of the evolution I); it is to be remarked that the difference of the prior art, at the predetermined instant $t_1$ and $t_2$ as a function of the instant $t_0$ are associated with the predetermined weights $P_1$ and $P_2$ of the powder in the receptacle 11, at least if they refer to the ideal evolution.

During the progress of a dosing cycle, the circuit 57 establishes a permanent comparison between the signal $V_{c2}$ and the consigned values furnished by the means 58 and 59, transmitted by the signals of the same nature as $V_{c2}$, that is to say, in electrical voltages in the illustrative example; as a function of such comparison, the circuit 57 controls the amplitude of vibration of the motors 5 which drive the vibrating means for the spout 4, through the intermediary of a control circuit 60 for the vibrator at the input of which there is fed continuously a output signal from the circuit 57, resulting from the above comparison.

The integrating comparators of the circuit 57 assure the result that at each instant of a dosing cycle a comparison between the signal $V_{c2}$ representative of the effective weight of powder received since the initial instant $t_1$ of the cycle by the receptacle 11 and:

on one hand a threshold representative of the theoretical weight at such instant conforming to the theoretical evolution I, in order to control the amplitude of vibration of the vibration motors 5 by the means 60 in such way, respectively, to increase or reduce such vibration so that, as a consequence, the rate of flow or feeding of powder by the spout 4 toward the receptacle 11 according to which the effective weight of the powder received by the receptacle 11 since the initial instant $t_0$ of the cycle is less than or superior to the theoretical weight corresponding to the evolution I: that which corresponds respectively to the zones of the real curve of evolution II disposed above and below the curve of theoretical evolution I in FIG. 3; taking account of the disassociation of the theoretical evolution I into two zones $I_a$ and $I_b$ corresponding respectively to a rate of flow or delivery comparatively large and to a rate of flow or delivery comparatively small, one thus observes an evolution II of the effective weight of the powder received by the receptacle 11 and the instant $t_0$ of the type indicated in FIG. 3 as a non-limiting example, corresponding to an alternation of the zones of evolution II respectively below or above the evolution I in the zone $I_a$, with the obtaining of an effective weight near P1 but rarely equal to $P_1$ at the instant $t_1$, then a progressive adaptation, without oscillation, of the evolution II to the evolution I in the zone $I_b$ thereof, resulting in a quasi-identity with $P_2$ of the effective weight of the powder received by the receptacle 11 at the instant $t_2$;

on the other hand a threshold representative of the predetermined final value $P_3$ reduced by the corresponding predetermined quantity corresponding to the error resulting from powder loss, in accordance with the consigned values affixed upon the first consigning memory means 58, to interrupt the functioning of the motors 5 for the vibrating spout 4 at the instant $t_2$, that is to say, since the recipient has received a weight $P_2$ of powder since the initial instant $t_0$ in such manner that, in allowing the powder to run into the receptacle 11 the residual powder corresponding to the error of effective powder loss one obtains, at the expiration of a sufficient predetermined delay for such feeding, that is to say for an instant $t_3$ predetermined with respect to the initial instant $t_0$, a weight of powder in the receptacle 11 equal to $P_3$ or near to $P_3$ to the eventual difference between the error of effective powder loss and the error of predetermined powder loss; the motors 5 cannot be put into instant action in the following cycle, in the hypothetical case, or they will reproduce the conditions imposed by the means 54 and more precisely by the consigning memory means 55 associated with means 54, that which implies in particular an emptying of the receptacle 11 between times.

The coincidence of the effective weight of powder received at the instant $t_3$, since the instant $t_0$, by the weighing receptacle 11 is nevertheless controlled, before the emptying of the receptacle, by a circuit 61 which controls the doses upon the entry thereinto of the signal $V_{c2}$, circuit 61 driven in parallel with circuit 57 for feeding or delivering the powder to the receptacle.

With such circuit 61 there are associated means 62 for consigning the tolerances of dosage, that is to say, an admissible upper limit and an admissible lower limit of the effective weight of powder received at the instant $t_3$ by the weighing receptacle 11, around the predetermined final value of the dose $P_3$ to be obtained; such tolerances being transformed into signals of the same nature as $V_{c2}$, that is to say, in electrical voltages in the illustrative example, the two consigned limits in the means 62 are driven by an integral comparator in the circuit 61 and which compares the signal $V_{c2}$ and, since such corresponds to an effective weight of powder disposed between such limits or outside of them, defines a respective good weight or a respective bad weight and operates in an appropriate manner the hydraulic cylinder 52 for adjusting the funnel 50 in the manner described above, before the operation of the cylinder 44 in the direction of movement to tip the receptacle 11 and to move said funnel 50; the general reference character 63 designates the circuit, commanded by the circuit 61, which assures successively such orientation of the funnel 50 and the positioning of the receptacle 11, since the return to the initial position of receptacle 11 in which the opening 38 is disposed on top (FIG. 2) with a view to accomplishment of the eventual following dosing cycle.

A complete dosing cycle will now be described particularly with reference to FIGS. 3 and 4.

It will be assumed that the receptacle 11 occupies the position shown in FIGS. 1 and 2, in which its opening 38 is at the top, after having undergone a change of position such that it has theoretically completely discharged the powder which it has contained; the spout 4 is motionless, said motors 5 being deenergized, and the powder which will eventually be fed not now flowing or being delivered.

The beginning of a dosing cycle can now be started, either by the invention of an operator, or automatically, when the apparatus is integrated in a chain of manufacturing mechanisms, and the fixed starting of the initial instant $t_0$ is caused as described above.

The means 13 emits at such instant a signal $V_c$ which the circuit 53 transforms into a signal $V_{c1}$ taking account an eventual change of the means 13 and incidentally representative of a certain weight of powder which can remain in the receptacle 11 after the preceding weighing operation; the signal $V_c$ is compared, in the circuit means 54, with consigned limits stored in circuit 55, and if it is located outside such limits, the alarm 56 is operated to signal that the quantity of powder discharged from the receptacle 11 at the end of the preceding cycle does not correspond to the measured weighed dose;

finally, if the value of $V_{c1}$ at the instant $t_0$ is greater than the upper limit consigned by the circuit 55, which signifies that an excessive quantity of powder remains in the receptacle 11 after the tipping of the same, the following cycle is aborted to discharge the powder then retained in the receptacle 11; except for such case, the circuit 54 operates normally and, taking into account that the value of the signal $V_{c2}$ of the circuit 54 is then zero, that is to say, less than the values consigned to the memory means 58 and 62, the motors 5 are placed in operation and the cycle operates in the following manner, accompanying at each instance the emission, at the output of the circuit 54, of a signal $V_{c2}$ the value of which is representative of the effective quantity of powder received by the receptacle 11 from the vibrating spout 4.

Upon the starting of the motors 5, the rate of feeding of powder from the spout 4 is generally low, and the curve II of evolution of the effective weight of powder in the receptacle 11 is generally located below the curve I of theoretical evolution, as is shown in FIG. 3; taking into account the comparison which is carried out in the means 57 between the two curves I and II, at every instant of the cycle following the instant $t_0$, such means 57 calculates the difference existing at each instant between the theoretical weight and the effective weight, less than the theoretical weight, and causes by the command means 60 for the vibrator an increase in the amplitude of vibration thereof, so as to increase the rate of feeding of the powder by the vibrating spout 4. Such rate of feeding of the powder increases progressively, so as to become greater than the slope of the segment $I_a$ to the right corresponding to the theoretical evolution I (FIG. 3), so that at an intermediate instant $t'$ between the instant $t_0$ when the predetermined instant $t_1$, the effective weight of the powder received by the receptacle 11 equals the theoretical weight, a fact which is confirmed by the comparative comparator of the circuit 57 which gives the order to the command circuit 60 for the motors 5 to reduce the amplitude of vibration, that is to say the rate of feeding of the powder; taking into account the inertia of the system, the effective weight of powder received by the receptacle 11 after the instant $t'$ is greater than the theoretical weight indicated by the part $I_a$ of the evolution I, and the order of reduction of the amplitude of vibration of the motors 5, that is to say, the rate of feeding of the powder, so that it becomes less than the slope of the portion $I_a$ of the curve I. At an instant $t''$ intermediate between $t'$ and $t_1$, the effective weight then again becomes equal to the theoretical weight and the curve II again crosses the curve I; one observes that a phenomenon which is analogous to that which is produced between $T_0$ and $t'$, the comparator of the circuit 57 ascertaining an effective weight received by the receptacle 11 since the instant $t_0$ less than the theoretical weight and thus causing, because of such fact, an increase in the direction of the amplitude of vibration of the motors 5, that is to say the augmentation of the rate of feeding of the powder by the spout 4.

It will be seen that simultaneously and proportionately around the length $I_a$ of the curve I of theoretical evolution of weight of the powder in the receptacle 11, the actual curve of evolution II of the weight progressively approximates the theoretical curve of the evolution; for reasons of clarity, the number of intersections of the two curves has been limited to two between the initial instant $t_0$ and the predetermined instant $t_1$, but such number may be different in reality, and particularly larger in order to permit as good an identification as possible of the curve II in the part $I_a$ of curve I before the instant $t_1$, where the transition between the zone $I_a$ of comparatively high flow rate and the zone $I_b$ of a comparatively low rate of flow occurs.

After the instant $t_1$, the comparison between the effective weight of powder received by the receptacle 11 following the initial instant $t_0$ takes place with the part $I_b$ of the theoretical curve of evolution I. The said zone $I_b$ in the illustrative example is a segment at the right of which the slope is somewhat less than that of the segment at the right of the zone $I_a$; taking in account the smaller value of the theoretical rate of flow in such zone, the comparison between the effective weight of powder received by the receptacle 11 after the initial instant $t_0$ and the theoretical weight at each instant between $t_1$ and $t_2$ appear as small variations of the actual rate of flow, and even in the case in which there is an absence of oscillation of the effective weight around the theoretical weight, as is the case in the illustrative example in which, the effective weight being greater than the immediate theoretical weight after the instant $t_1$, the real curve of evolution II is progressively mingled with the zone $I_b$ of the theoretical curve of evolution I, without having the real weight become inferior to the theoretical weight in a single instant between $t_1$ and $t_2$, the fusion between the two curves being total since before the instant $t_2$, which translates into a constant amplitude of vibration of the motors 5 of the spout 4 and a constant rate of flow of the powder therefrom, corresponding to the slope of the zone $I_b$ of the curve; because of this fact, at the predetermined instant $t_2$, the receptacle 11 has received an effective weight of powder coincidence with a maximum of precision with the weight $P_2$ determined by deduction, and the dose $P_3$ to be obtained, of a quantity corresponding to the error of powder loss determined by empirical example.

When the comparator of the circuit 57 establishes that the reception since the initial instant $t_0$, by the weighing receptacle 11, of a weight of powder corresponding to $P_2$, at the instant $t_2$, it causes via the circuit 60 the stoppage of the motors 5, that is to say the immobilization of the spout 4 from which there flows after the instant $t_2$, a quantity of powder corresponding to the effective error of powder loss, more or less close to the predetermined error of loss of powder.

At a predetermined instant $t_3$ with reference to the initial instant $t_0$, and correspnding to the flow of the powder, since the instant $t_2$, and for a time sufficient to permit the stoppage of all flow of powder from the spout 4 because of the error of powder loss, the circuit 61 for controlling the doses compares the value of $V_{c2}$ to the consigned limits in memory 62 in order to determine if the effective weight of powder received by the receptacle 11 since the initial instant $t_0$ is located between such limits, in which case the dose is good and the transit funnel 60 is oriented in consequence by an appropriate action of the emptying circuit 63 upon the cylinder 52, or if it is situated outside such limits, in which case the dose is bad and the means 63 acts in consequence upon the cylinder 52 for adjusting the feeding means 50, then the means 63 causes, by action upon the cylinder 45, the turning of the receptacle 11 in the direction 41 to discharge the powder therein, then in return to the position in which its opening 38 is turned toward the top to begin a new cycle; then by the functioning of the cylinder 45, the hydraulic dashpot 46 avoids the transmission of vibrations to the receptacle 11 and the system 13 which could otherwise deteriorate them.

A dosing cycle is then ended, and another cycle can then commence.

Naturally, the method of the invention and the apparatus for practicing such method which have been described constitute only a non-limiting example, of which there can be numerous variations without departing from the body of the present invention; in particular, the nature of the signals emitted and compared in the different stages of the method, of the electrical voltages described above in the non-limiting example, can be different, being either analog or numerical, and the components of the circuits in the described apparatus will be chosen in consequence by one skilled in the art within the body of his normal aptitudes; the practical realization of the described circuits in reference to FIG. 4 is equally in the domain of normal aptitudes of one skilled in the art, and it is to be understood that such practical carrying out of the invention may be accomplished by means which are particularly simple and relatively economical.

Although the invention is described and illustrated with reference to a single embodiment thereof, it is to be expressly understood that it is in no way limited to the disclosure of such preferred embodiment but is capable of numerous modifications within the scope of the appended claims.

We claim:

1. Method of dosing a powder by weight, employing a balance 12 provided with a weighing receptacle 11 and with means 13 for continuously measuring the effective weight of the effective contents of the receptacle 11, and means 4, 5 for positively feeding powder to be dosed toward the weighing receptacle 1, consisting of means which during a dosing cycle energizes feeding means 4, 5 at an initial instant $t_0$ at which the receptacle 11 is theoretically empty to a final instant $t_2$ in which the receptacle 11 has received from the feeding means 4, 5 since the initial instant, a weight of powder of a predetermined value $P_2$ less than a predetermined final value to be obtained $P_3$ of a quantity corresponding ($P_3$ minus $P_2$) to an error of powder loss caused by the feeding means 4, 5 to interrupt at such final instant $t_2$ the functioning of the powder feeding means 4, 5 and to permit thereafter residual powder flow into the receptacle 11 corresponding to the effective amount of the error through powder loss, characterized in that the final instant $t_2$ has been predetermined with reference to the initial instant $t_0$ as well as an ideal evolution I of the weight of powder received by the receptacle 11 as a function of time from the initial instant $t_0$ to the final instant $t_2$, and that each instant of the operation of the feeding means 4, 5 the effective weight of the powder received by the receptacle 11 since the initial instant $t_0$ is compared with a theoretical weight which conforms to the ideal evolution I and one continuously controls the operation as a function of the resultant of such comparison, in order to increase the rate of flow of powder if the effective weight thereof is less than the theoretical weight at the instant considered or to reduce the rate of feeding of the powder if the effective weight thereof is greater than the theoretical weight of the powder at the instant considered, and thus to adapt the evolution II of the effective weight of powder received by the receptacle 11, when the feeding means 4, 5 are functioning, to achieve an ideal evolution I of the feeding of the powder, predetermining an upper admissible limit and a lower admissible limit around the said predetermined final value $P_3$ and in that, at the expiration of a predetermined delay sufficient for the flowing into the receptacle 11, after the final instant $t_2$, of the residual powder corresponding to the error of powder less during its transmission, one compares the effective weight of powder received by the receptacle 11 to said limits, in order to define a good weight or a bad weight depending upon whether the effective weight is located between said upper and lower limits or outside said limits.

2. Dosing method according to claim 1 comprising predetermining the ideal evolution I of the weight of powder received in the receptacle as a function of time in such manner as to define a rate of powder delivery which is comparatively large at the initial instant $t_0$ to an intermediate instant $t_1$ determined with reference to the initial instant $t_0$ and a rate of flow which is comparatively low at the intermediate instant $t_1$ to the final instant $t_2$.

3. Method of dosing powder according to claim 1, wherein one predetermines in an empirical manner the said quantity corresponding to the error of powder loss during feeding thereof.

4. Method of dosing powder according to claim 1 wherein one determines at each instant the effective weight of powder received from the feeding means by the receptacle, from the initial instant $t_0$ and deducing, from the measured value furnished at the instant under consideration by the measuring means, the measured value furnished by the measuring means at the initial instant $t_0$.

5. Dosing method according to claim 4, wherein one predetermines an upper positive limit and a lower negative limit at the value measured by the measuring means at the initial instant $t_0$ of each cycle and, depending upon whether such value is situated between or outside said limits, respectively, one defines a dosage which is good or bad, in order to abort the present cycle if such value exceeds the upper limits.

6. Method of dosing powder according to claim 1 comprising employing a vibrating spout for feeding the powder in the positive feeding means, and increasing the rate of feeding of the powder as rrequired by increasing the amplitude of vibration of the spout or decreasing the rate of feeding of the powder as required by reducing the amplitude of vibration of the spout.

7. Apparatus for dosing predetermined weights of powder according to the method defined by claim 1, comprising:
   a balance 12 provided with a weighing receptacle 11 and means 13 for continuously measuring the effective weight of the contents of the receptacle 11, means 11 emitting weight of the contents of the receptacle 11, means 11 emitting at each instance a first signal $V_{c2}$ representing such weight,
   positive means 4, 5 of feeding a powder to be dosed toward the weighing receptacle 11, at an initial instant to said means discharging the powder above the receptacle 11, said means discharging the powder above the receptacle 11, characterized in that it comprises at least:
   first means 58 for consigning a predetermined final value $P_3$ of weight of powder to be obtained and a predetermined quantity $P_3$ minus $P_2$ corresponding to an error in the quantity of powder occasioned by its being handled by the feeding means 4, 5, characterized in that the final instant $t_2$ has been predetermined with reference to the initial instant to as well as an ideal evolution I of the weight of powder received by the receptacle 11 as a function of time from the initial instant $t_o$ to the final instant $t_2$ second consigning means 58, for consigning an ideal evolution I of the weight of powder received by the receptacle 11 as a function of time, in the course of a dosing cycle, so as to achieve an ideal evolution I of the feeding of the powder, wherein the flow of powder is increased if the effected weight in receptacle 11 is less than the theoretical weight at a specific time instant, or is decreased if the effective weight found already fed into the receptacle 11 is greater than the theoretical weight at a specific time instant a first comparator 57 comparing at each instant a first signal $V_{c2}$ of a part to a predetermined threshold representative of said final predetermined value $P_3$ reduced by said predetermined quantity ($P_3$ minus $P_2$) and on the other part to a threshold representative of a theoretical weight at such instant, conforming to said theoretical evolution II, to emit a second signal, as a function of such comparison, a slave means 60 continuously controlling the function of the rate of feeding powder by the feeding means 4, 5 in response to said second signal, at least third consigning means 60 to consign an upper admissible limit and a lower admissible limit about said predetermined final value $P_3$, a second comparator 61 comparing the first signal $V_{c2}$ and the said respective admissible upper and lower limits, and means 61 determining a good weight or a bad weight as a function of such comparison.

8. Apparatus according to claim 7, wherein the means for continuously measuring the effective weight of powder contained in the receptacle comprises reset to zero means.

9. Dosing apparatus according to claim 8, comprising a fourth consigning means for consigning two limits of the zero reset means, a third comparator comparing the reset to zero effective within said limits, and alarm means operated by the third comparator as a function of such comparison.

10. Dosing apparatus according to claim 7 wherein the means for continuously measuring the effective weight of the powder in the receptacle comprises strain gauges positioned in an enclosure and provided with means for feeding into said enclosure air under super-atmospheric pressure.

11. Dosing apparatus according to claim 7 wherein the means for feeding a powder to be dosed toward the receptacle comprises a spout disposed under a hopper containing powder to be dosed and provided with motors for vibrating the spout to cause the feeding of the powder, by way of the spout, from the hopper to the weighing receptacle, and the slave means continuously monitoring and controlling the function of the apparatus and of the rate of feeding the powder by the feeding means by means of the second signal comprises means responsive to the operation of the motors, the absence of operation of the motors, and the amplitude of vibration of the spout caused by the motors when they are operating.

* * * * *